(12) United States Patent
Sauter et al.

(10) Patent No.: US 8,677,478 B2
(45) Date of Patent: Mar. 18, 2014

(54) METHOD AND SYSTEM FOR REMOVING AUTHENTICATION OF A SUPPLICANT

(75) Inventors: Susan M. Sauter, Murphy, TX (US); Jason D. Frazier, Raleigh, NC (US); Ian Foo, Raleigh, NC (US); Gregory A. Moore, Sedalia, MO (US); Troy H. Sherman, San Jose, MO (US)

(73) Assignee: Cisco Technology, Inc., San Jose, CA (US)

( * ) Notice: Subject to any disclaimer, the term of this patent is extended or adjusted under 35 U.S.C. 154(b) by 1838 days.

(21) Appl. No.: 11/083,434

(22) Filed: Mar. 17, 2005

(65) Prior Publication Data
US 2006/0209705 A1  Sep. 21, 2006

(51) Int. Cl.
*G06F 11/00* (2006.01)

(52) U.S. Cl.
USPC .......................................... 726/22

(58) Field of Classification Search
USPC ......... 709/201–203, 208, 218–219, 223–225, 709/227–230; 726/2–5, 17–18, 22, 27; 713/154, 168; 725/9, 25, 27, 54, 725/62–66, 744, 81, 90–93; 710/9, 15–19, 710/26, 28–29, 31–33, 36, 38, 200–244; 370/229–230, 230.1, 231, 343, 345, 370/348–349, 351
See application file for complete search history.

(56) References Cited

U.S. PATENT DOCUMENTS

| | | | |
|---|---|---|---|
| 6,115,376 A * | 9/2000 | Sherer et al. | 370/389 |
| 6,377,569 B1 | 4/2002 | Tsujigawa et al. | 370/352 |
| 6,457,039 B1 | 9/2002 | Fogelholm et al. | 709/200 |
| 6,564,261 B1 | 5/2003 | Gudjonsson et al. | 709/227 |
| 6,594,253 B1 | 7/2003 | Sallberg et al. | 370/349 |
| 6,681,252 B1 | 1/2004 | Schuster et al. | 709/227 |
| 6,690,675 B1 | 2/2004 | Kung et al. | 370/401 |
| 6,721,401 B2 | 4/2004 | Lee et al. | 379/93.17 |
| 6,763,226 B1 | 7/2004 | McZeal, Jr. | 455/90.2 |
| 7,120,125 B2 * | 10/2006 | Kikuchi et al. | 370/252 |
| 7,124,197 B2 * | 10/2006 | Ocepek et al. | 709/232 |
| 7,127,477 B2 * | 10/2006 | Duncombe et al. | 707/203 |
| 7,263,597 B2 * | 8/2007 | Everdell et al. | 712/11 |
| 7,293,087 B2 * | 11/2007 | Styles et al. | 709/224 |
| 7,293,289 B1 * | 11/2007 | Loc et al. | 726/23 |
| 7,294,056 B2 * | 11/2007 | Lowell et al. | 463/17 |
| 7,313,612 B1 * | 12/2007 | Kakimoto | 709/223 |
| 7,440,573 B2 * | 10/2008 | Lor et al. | 380/270 |
| 7,568,107 B1 * | 7/2009 | Rathi et al. | 713/182 |
| 7,587,750 B2 * | 9/2009 | Zimmer et al. | 726/2 |
| 7,779,071 B2 * | 8/2010 | Lor et al. | 709/203 |
| 2006/0165073 A1 * | 7/2006 | Gopinath et al. | 370/389 |
| 2008/0043686 A1 * | 2/2008 | Sperti et al. | 370/338 |

* cited by examiner

*Primary Examiner* — Joseph P. Hirl
*Assistant Examiner* — Leynna Truvan
(74) *Attorney, Agent, or Firm* — Baker Botts L.L.P.

(57) ABSTRACT

According to one embodiment, a method for removing authentication of a supplicant includes monitoring communication between the supplicant and an authenticator. The method also includes determining, based on the monitored communication, the MAC address for the supplicant and an attachment port of the supplicant to the intermediate network device disposed between the supplicant and the authenticator through which the monitored communication occurs. The method also includes determining that the supplicant no longer has a link connection with the intermediate network device, and in response, sending via the intermediate network device a logoff message having a spoofed source address of the supplicant to the authenticator.

38 Claims, 1 Drawing Sheet

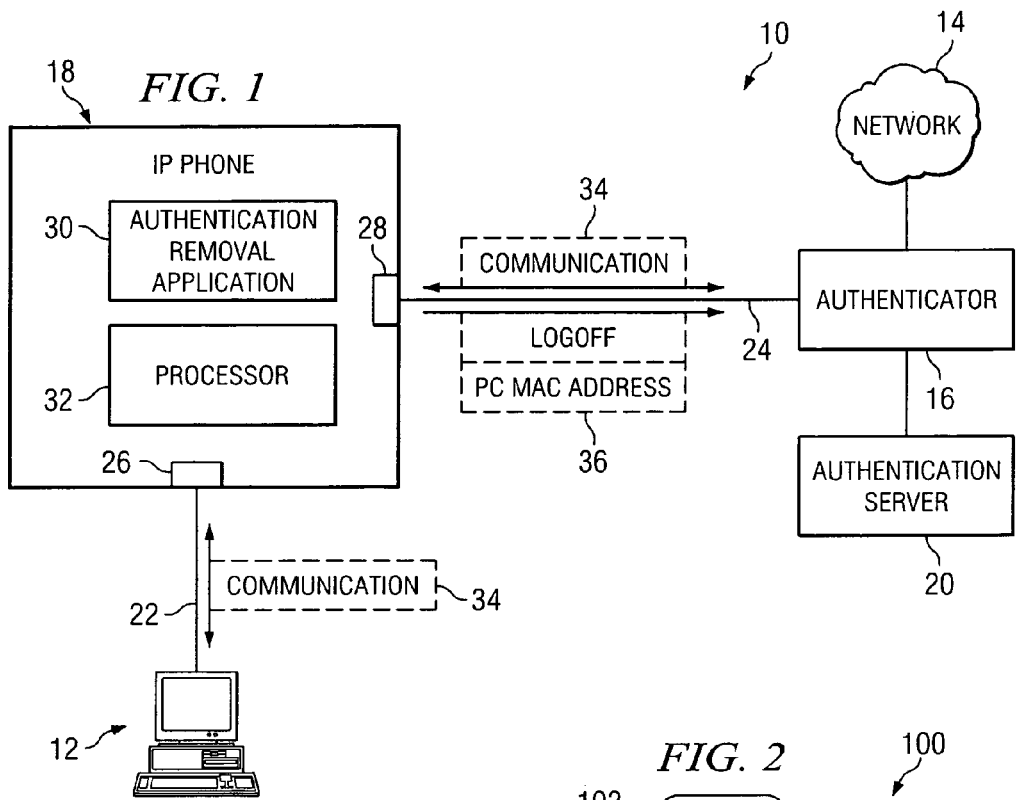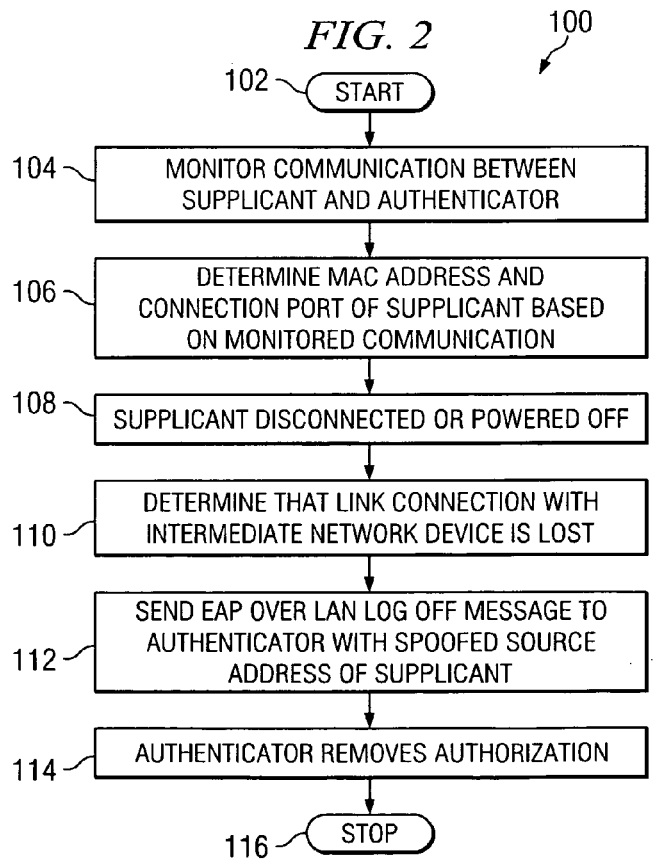

METHOD AND SYSTEM FOR REMOVING AUTHENTICATION OF A SUPPLICANT

TECHNICAL FIELD OF THE INVENTION

This invention relates generally to authentication of network devices and more particularly to a method and system for removing authentication of a supplicant.

BACKGROUND OF THE INVENTION

Communications, and particularly Internet protocol communications, are becoming increasingly prevalent in today's society. The increasing use of Internet protocol (IP) phones in combination with other network devices has created a situation where the IP phone serves, in essence, as a hub for other network devices. One example of this implementation is the connection of a personal computer or a work station to an IP phone that is connected to an upstream switch.

Currently there is no mechanism for a switch that is acting in the role of an IEEE 802.1X Authenticator to be notified of a link event where there is a non-authenticating intermediate device connected to its port. For example, in the above-described implementation, there is no way to notify the upstream switch when the personal computer or workstation is disconnected from the IP phone. This inability to detect the link going away creates a situation where a device plugged into the intermediate device can authenticate into the network and then being unplugged, leaving these port enabled. This is problematic because another device could then be plugged into and acquire use of the network without having to authenticate into it. This situation occurs, for example, when a personal computer is plugged into the personal computer port of an IP phone. Because the phone does not implement an 802.1X Authenticator Port Access Entity ("PAE"), the attached personal computer authenticates with the upstream switch. Because the personal computer is not directly connected to the authenticator, a link event cannot be detected.

SUMMARY

According to one embodiment, a method for removing authentication of a supplicant includes monitoring communication between the supplicant and an authenticator. The method also includes determining, based on the monitored communication, the MAC address for the supplicant and an attachment port of the supplicant to the intermediate network device disposed between the supplicant and the authenticator through which the monitored communication occurs. The method also includes determining that the supplicant no longer has a link connection with the intermediate network device, and in response, sending via the intermediate network device a logoff message having a spoofed source address of the supplicant to the authenticator.

Some embodiments of the invention provide numerous technical advantages. Some, none, or all embodiments of the invention may benefit from the below-described advantages. According to one embodiment of the invention, authentication for a supplicant device is removed at an appropriate time upon removal of a link connection. This provides increased network security by preventing the leaving of an authenticated port as authenticated even when the device to which it is connected is removed from the port. Doing so prevents an unauthenticated device from plugging into that authenticated port and being inadvertently automatically authenticated.

Other advantages will be readily apparent to one of skill in the art.

BRIEF DESCRIPTION OF THE DRAWINGS

For a more complete understanding of the present invention and its advantages, references now made to the following description, taken in conjunction with the accompanying drawings, in which:

FIG. 1 is a schematic diagram illustrating a communication system according to the teachings of the invention; and FIG. 2 is a flowchart illustrating a method for removing authentication according to the teachings of the invention.

DETAILED DESCRIPTION OF EXAMPLE EMBODIMENTS

Embodiments of the present invention and its advantages are best understood by referring to FIGS. 1 through 2 of the drawings, like numerals being used for like and corresponding parts of the various drawings.

FIG. 1 is a schematic diagram illustrating a communication system 10 according to the teachings of the invention. Communication system 10 includes a supplicant 12 coupled to a network 14, such as the Internet, through a authenticator 16 and intermediate network device 18, such as Internet Protocol (IP) phone. In this example, authenticator 16 acts as an authenticator for network 14, meaning that it authenticates the authority of other devices to be connected to network 14. In one example, authenticator 16 is a switch and acts as an IEEE 802.1X Authenticator; however, other authentication protocols may be used without departing from the scope of the invention. In one example, authenticator 16 may be coupled to an authenticator server 20 that performs many of the authentication functions and cooperates with authenticator 16 in performing the authentication process. As used herein however, "authenticator" refers to the device providing the authentication service, whether or not connected to an authentication server.

In this example supplicant 12 is a personal computer; however, supplicant 12 may be any network device that is connected to the authenticator through an intermediate network device. Another example of a supplicant is a work station.

Intermediate network device 18 is an IP phone, in this example; however, other suitable intermediate devices may be used, including a simple port switch or a hub. In this example, IP phone 18 includes, in addition to the standard IP phone functionality, an authentication removal application 30 that may be executed by a processor 32. Processor 32 may form a portion of standard IP phone processor or may be a separate processor for executing authentication removal application 30. Authentication removal application 30 may be implemented in software in executing processor 32, as shown, or may be implemented through other techniques, including as an application specific integrated circuit. Example functions of authentication removal application 30 are described in greater detail below in conjunction with FIG. 2.

Supplicant 12 is connected to intermediate network device 18 through, in this example, an Internet connection 22, and intermediate network device 18 is connected to authenticator 16 through, in this example, an Internet connection 24. Internet connection 22 couples supplicant 12 to intermediate network device 18 at a port 26. Internet connection 24 couples authenticator 16 to intermediate network device 18 at a port 28.

In operation, intermediate network device 18 couples to network 14 through authenticator 16. Authenticator 16 authenticates intermediate network device 18, in one example, according to IEEE 802.1X Authentication protocol. Then, whenever a supplicant device 12 couples to intermediate device 18, authenticator 16 authenticates that device for communication with network 14. As described above, conventionally, if a link connection between supplicant 12 and intermediate device 18 is removed, port 26 would remain an authenticated port to which any network device could be coupled without proper authentication. As used herein, link connection refers to an active connection between two network devices, which could be removed by physically disconnecting one network device from the other, powering down one of the network devices, or through other techniques.

According to the teachings of the invention, leaving an authenticated port of intermediate network device 18 authenticated upon removal of a link to connection between intermediate network device 18 and a supplicant 12 is avoided by determining that the supplicant no longer has a link connection with the intermediate network device, and in response, sending by the intermediate network device a logoff message having a spoofed source address of the supplicant 12 to authenticator 16. This allows for proper removal of authentication of intermediate network when a link connection has been disabled without an associated standard logoff. By using the spoofed MAC address of supplicant 12, it appears, in one embodiment, to authenticator 16 that supplicant 12 has properly logged off, allowing switch 12 to remove the authentication for port 26. In one embodiment, a logoff message 36 is an Extensible Authentication Protocol Over Local Area Network (EAPOL) message, which is used by the IEEE 802.1X standard; however, other suitable messages may be used. Additional details are described below in connection with FIG. 2.

According to one embodiment, in order to send a logoff message having a spoofed source address of the supplicant to the authenticator, the identity of the port to which the supplicant is connected must be determined. One way of making this determination is by monitoring communication 34 between the supplicant 12 and the authenticator 16. By monitoring this communication 34, intermediate network device 18 may determine that supplicant 12 is connected to port 26 and authenticator 16 is connected to port 28. This determination may be performed according to conventional techniques, or through yet to be developed techniques. Further, determination of the port of the intermediate network device 18 to which the supplicant 12 is connected may be performed in other manners, including simply using a port determination performed by intermediate network device 18 for other purposes.

FIG. 2 is a flowchart illustrating example acts associated with a method 100 for removing authentication of a supplicant according to the teachings of the invention. Method 100 begins at step 102. At step 104 communications are monitored between supplicant, such as supplicant 12, and the authenticator, such as authenticator 16. A purpose of monitoring communication between the supplicant and the authenticator is to determine to which port the supplicant is connected. Given access to communications between a supplicant and authenticator, an intermediate network device may be able to determine to which port the supplicant is connected. Once it is known to which port the supplicant is connected, intermediate network device can take appropriate action when a link connection is disabled to that port. That action requires, in some embodiments, the MAC address of the supplicant. Thus, at step 106, the MAC address and connection port of the supplicant is determined based upon the monitored communication. However, the MAC address may be otherwise known (as may the attachment port) to the intermediate network device without examining of the communication.

At step 108, the supplicant is disconnected, powered off, or the link connection between the supplicant and the intermediate network device is otherwise disabled. In such a case, the teachings of the invention recognize that it would be desirable that the authentication of any subsequent device connected to the attachment port (such as port 26) would be disabled rather than automatically enabled, thus preventing improper authentication of unauthenticated devices.

At step 110 it is determined that the supplicant no longer has a link connection with the intermediate network device. This determination may be made according to conventional techniques, or yet to be developed techniques.

In response to determining that the link connection with the intermediate network device is lost, the intermediate network device sends a message to the authenticator mimicking a logoff procedure at step 112. In one example, this message is an EAPOL logoff message that includes a spoofed source address of the supplicant. By including the spoofed source address of the supplicant (the MAC address), it appears to the authenticator that the supplicant has properly logged off, resulting in the authenticator removing the authentication for the associated port of the intermediate network device. This prevents an unauthenticated device attaching to an open authenticated port of an intermediate network device, resulting in better network security. Authentication is then removed by the authenticator, as indicated at step 114. The method concludes at step 116.

Thus, a method and system are provided that automatically remove authentication for a supplicant when the link connection to an intermediate network device is removed. This prevent unauthenticated devices from attaching to an open port for which authentication has not been properly removed.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method for removing authentication of a supplicant comprising:

monitoring, by an intermediate network device, communication between the supplicant and an authenticator, the supplicant coupled to an attachment port of the intermediate network device, the intermediate network device disposed between the supplicant and the authenticator, the communication between the supplicant and the authenticator passing through the intermediate network device;

determining, by the intermediate network device based on the monitored communication, the MAC address for the supplicant and the attachment port of the intermediate network device; and determining, by the intermediate network device, that the supplicant no longer has a link connection with the intermediate network device, and in response, preventing, by the intermediate network device, a subsequent unauthenticated device from attaching to the attachment port of the intermediate network device by sending by the intermediate network device a logoff message having a spoofed source address of the supplicant to the authenticator, the logoff message being sent after the link connection between the supplicant and the intermediate network device is lost.

2. The method of claim 1, wherein the intermediate network device is an IP phone.

3. The method of claim 1, wherein the intermediate network device is a hub.

4. The method of claim 1, wherein the intermediate network device is a port switch.

5. The method of claim 1, wherein monitoring the communication between the supplicant and the authenticator comprises monitoring the communication between the supplicant and the authenticator by the intermediate device.

6. The method of claim 1, wherein the authenticator is an upstream switch.

7. The method of claim 1, wherein the authenticator is connected to an authentication server.

8. The method of claim 1, wherein the supplicant is a personal computer.

9. The method of claim 1, wherein the supplicant is a work station.

10. The method of claim 1, wherein the logoff message is an EAPOL logoff message.

11. A communication system comprising:
an authenticator;
an intermediate network device coupled to the authenticator, the intermediate network device comprising an attachment port; and
a supplicant coupled to the attachment port of the intermediate network device;
wherein the intermediate network device is operable to:
provide a communicative connection between the authenticator and the supplicant;
monitor communication between the supplicant and the authenticator;
determine, based on the monitored communication, the MAC address for the supplicant; and
determine that the supplicant no longer has a link connection with the intermediate network device and in response prevent a subsequent unauthenticated device from attaching to the attachment port of the intermediate network device by sending a logoff message to the authenticator, the logoff message having a spoofed source address of the supplicant, the logoff message being sent after the link connection between the supplicant and the intermediate network device is lost.

12. The communication system of claim 11, wherein the intermediate network device is an IP phone.

13. The communication system of claim 11, wherein the intermediate network device is a hub.

14. The communication device system of claim 11, wherein the intermediate network device is a port switch.

15. The communication system of claim 11, wherein the authenticator is a switch upstream of the supplicant.

16. The communication system of claim 11, and further comprising an authentication server coupled to the authenticator.

17. The communication system of claim 11, wherein the supplicant is a personal computer.

18. The communication system of claim 11, wherein the supplicant is a work station.

19. The communication system of claim 11, wherein the logoff message is an EAPOL logoff message.

20. The communication system of claim 11, wherein the intermediate network device is further operable to determine, based on the monitored communication, an attachment port of the supplicant to the intermediate network device.

21. A network device comprising:
a first port coupled to an authenticator;
an attachment port coupled to a supplicant; and
logic encoded in media and operable to:
monitor at the network device communication between the supplicant and the authenticator, the communication between the supplicant and an authenticator passing through the network device;
determine at the network device, based on the monitored communication, the MAC address for the supplicant; and
determine at the network device that the supplicant no longer has a link connection with the network device and in response prevent a subsequent unauthenticated device from attaching to the attachment port by sending a logoff message to the authenticator, the logoff message having a spoofed source address of the supplicant, the logoff message being sent after the link connection between the supplicant and the network device is lost.

22. The network device of claim 21, wherein the network device is an IP phone.

23. The network device of claim 21, wherein the network device is a hub.

24. The network device of claim 21, wherein the network device is a port switch.

25. The network device of claim 21, wherein the logoff message is an EAPOL logoff message.

26. The network device of claim 21, wherein the authenticator is a switch.

27. The network device of claim 21, wherein the supplicant is a personal computer.

28. The network device of claim 21, wherein the supplicant is a work station.

29. The network device of claim 21, wherein the logic is further operable to determine, based on the monitored communication, an attachment port of the supplicant to the intermediate network device.

30. A network device comprising:
a first port coupled to an authenticator;
an attachment port coupled to a supplicant; and
authentication removal means for:
monitoring at the network device communication between the supplicant and the authenticator, the communication between the supplicant and an authenticator passing through the network device;
determining at the network device, based on the monitored communication, the MAC address for the supplicant; and
determining at the network device that the supplicant no longer has a link connection with the network device and in response preventing a subsequent unauthenticated device from attaching to the attachment port by sending a logoff message to the authenticator, the logoff message having a spoofed source address of the supplicant, the logoff message being sent after the link connection between the supplicant and the network device is lost.

31. The network device of claim 30, wherein the network device is an IP phone.

32. The network device of claim 30, wherein the network device is a hub.

33. The network device of claim 30, wherein the network device is a port switch.

34. The network device of claim 30, wherein the logoff message is an EAPOL logoff message.

35. The network device of claim 30, wherein the authenticator is a switch.

36. The network device of claim 30, wherein the supplicant is a personal computer.

37. The network device of claim 30, wherein the supplicant is a work station.

38. The network device of claim 30, wherein the authentication means is further for determining, based on the monitored communication, an attachment port of the supplicant to the intermediate network device.

\* \* \* \* \*